UNITED STATES PATENT OFFICE.

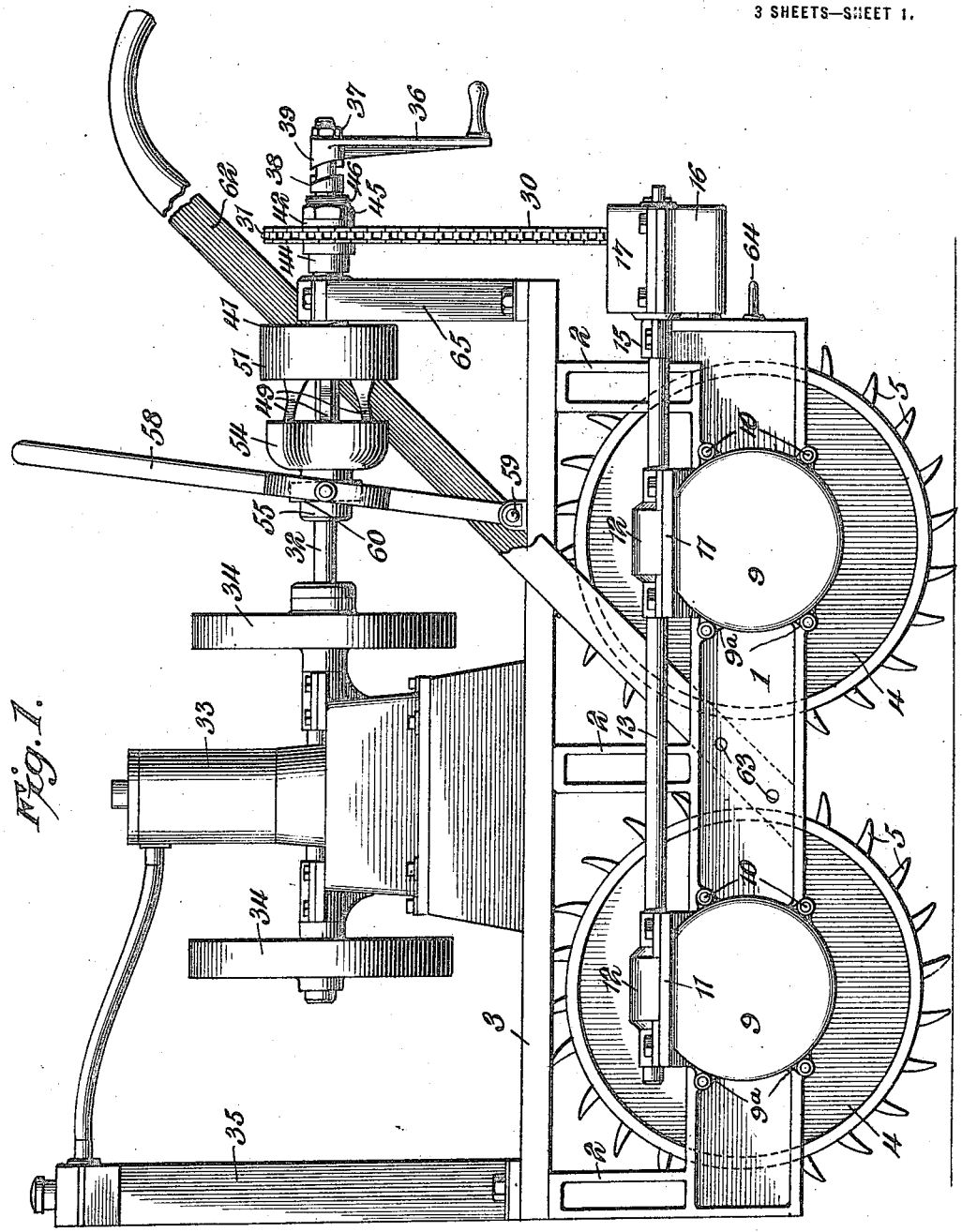

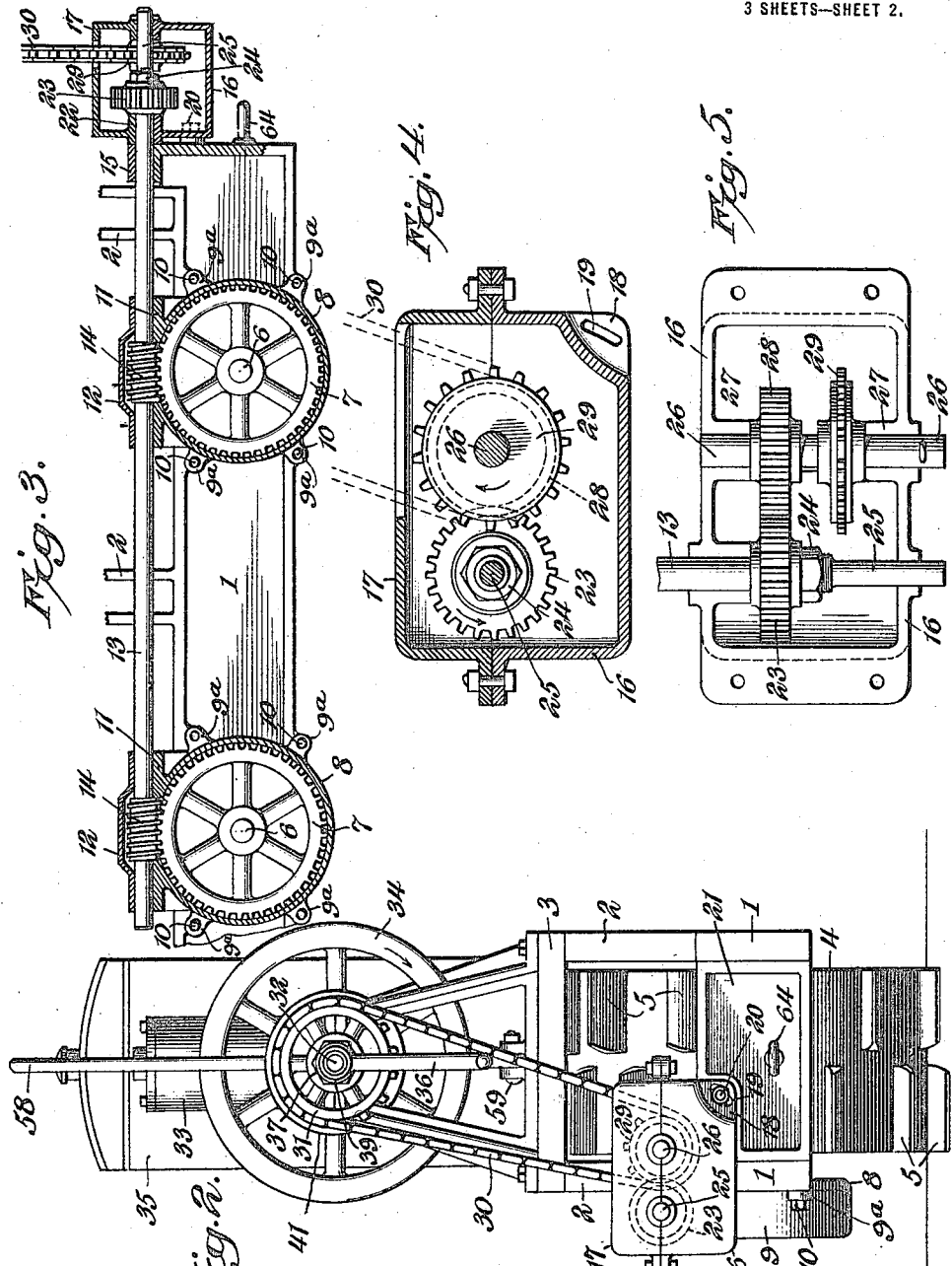

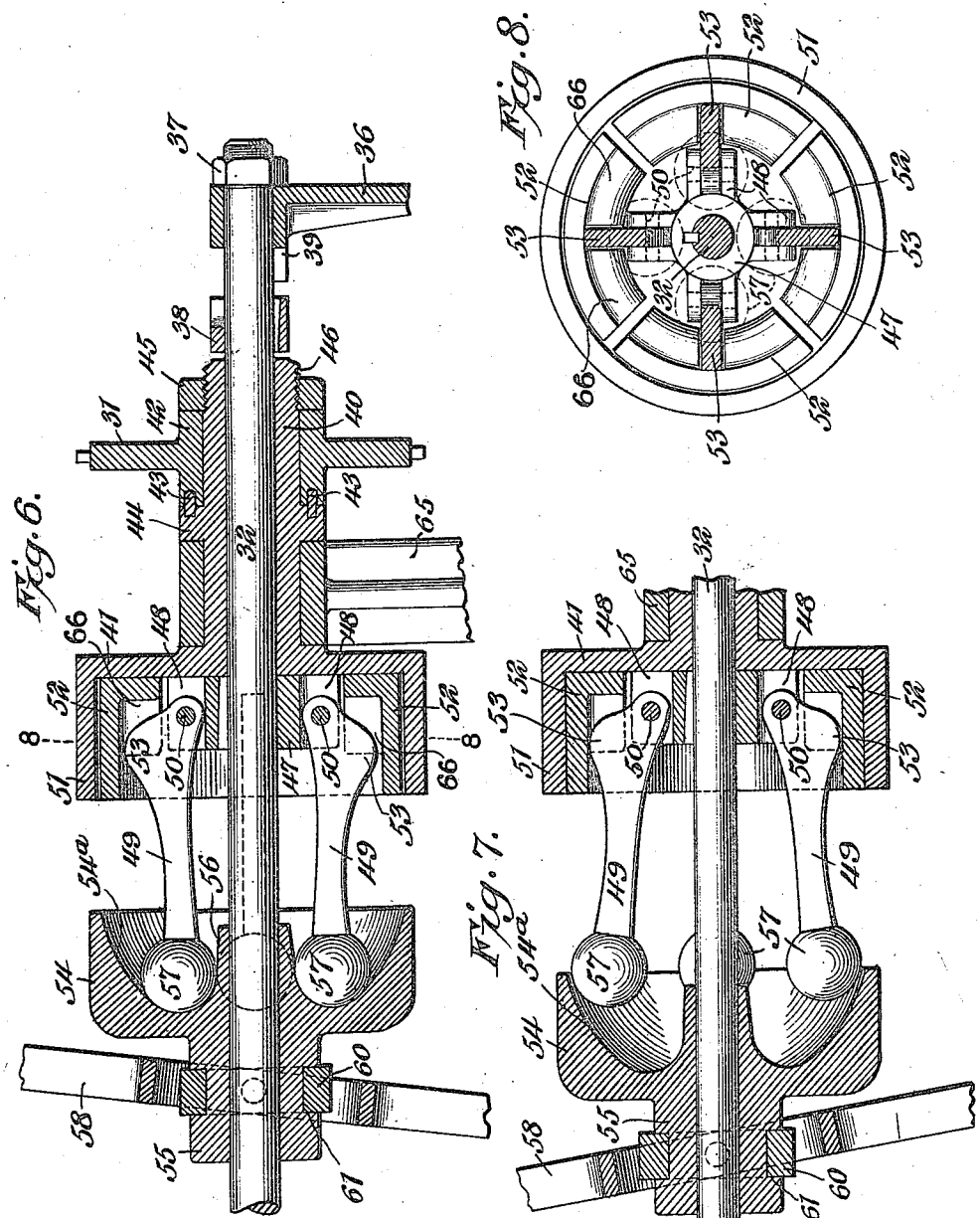

WILLIAM GEORGE WILMS, OF SAN PEDRO, CALIFORNIA.

TRACTOR.

1,416,539.

Specification of Letters Patent.  Patented May 16, 1922.

Application filed July 26, 1921. Serial No. 487,573.

*To all whom it may concern:*

Be it known that I, WILLIAM G. WILMS, a citizen of the United States, residing at San Pedro, in the county of Los Angeles and State of California, have invented a new and useful Tractor, of which the following is a specification.

This invention relates to tractors, and is more particularly directed to a self-propelled vehicle used for agricultural purposes.

An object of this invention is to provide a new and improved tractor in which all of the traction wheels are positively driven, and in which the flexible connections, operatively connecting the drive shaft with the shaft that operates the wheel, may be readily adjusted with very little trouble.

The invention further contemplates a new and improved positioning of the handles by which the tractor is steered in order that the direction of travel of the tractor is readily controlled.

The invention further contemplates a novel clutching mechanism by which the drive shaft of the engine and the countershaft which cause rotation of the traction wheels may be readily connected or disconnected.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a side elevation of the tractor.

Fig. 2 is a rear end elevation of the tractor.

Fig. 3 is a sectional view of the operating means to drive the tractor wheel.

Fig. 4 is a vertical section of the gear box.

Fig. 5 is a plan view of the gear box and the gear with the cover removed.

Fig. 6 is a vertical longitudinal section of the clutching mechanism showing the clutch in inoperative position.

Fig. 7 is a view of the same with the clutch in engagement.

Fig. 8 is a transverse section along the line 8—8 of Fig. 6.

In the drawing, 1 designates the longitudinal side members of the frame provided with the standards 2 upon which is supported the table or platform 3. Between the side frame members 1 are located traction wheels 4 having ground-engaging claws or teeth 5 projecting outwardly from the periphery of the wheels. The wheels are rigidly mounted upon axles 6 having bearings in the side members 1. Upon the outer end of each axle are rigidly mounted gears 7, enclosed by a casing 8 provided with a cover 9, which is secured to the casing by means of the bolts 10 and spaced projecting ears $9^a$.

The casing and cover, together with their extensions 11, upon which is mounted a plate 12, form bearings for the driven shaft 13, and a casing for the worm gears 14. The worm gears mesh with the gears 7. Upon the rear end of a side member 1 is likewise formed a bearing 15 for the shaft 13.

A gear box 16 is pivotally mounted upon the rear end of the worm shaft 13 and is provided with a cover 17. An offset portion or lug 18, upon the lower corner of the casing 16, is provided with a slot 19, through which is inserted the free end of a bolt 20, the other end being rigidly secured to a transverse plate 21 of the frame that connects the side members 1 together (Fig. 2). It will be seen, by this arrangement, that the gear box 16 may be shifted bodily having the countershaft 13 as its axis of rotation. The countershaft 13 has a split bearing 22, part of which is located in the casing, the other part being formed in the cover.

A gear 23 is made fast upon the shaft 13 by means of a nut 24. The extreme outer end 25 of the shaft 13 is reduced and has a bearing formed in the gear casing and the cover. A stub shaft 26 is rotatably mounted in split bearings 27, each half of the bearings being formed in the casing and the cover, respectively. Rigidly mounted on the stub shaft 26, and spaced from each other, are a gear 28 meshing with the gear 23, and a sprocket wheel 29 driven by a chain 30 which in turn is driven by a sprocket wheel 31 loose on a drive shaft 32 of the engine 33. The engine 33 is of any well known construction and is mounted upon the table or platform 3 and provided with the usual fly wheels 34 and radiator 35. The outer end of the shaft 32 is mounted in a bearing formed on the upper end of a bracket 65 which is secured to the table 3 (Fig. 1).

A crank 36, loosely mounted on the drive shaft 32, is held thereon by a nut 37. The usual members 38, 39 of the dog clutch are adapted to engage each other when the crank shaft 32 is rotated by means of the crank for starting the engine. The member 38 is rigidly mounted on the shaft 32. Spaced from the member 38 of the dog clutch is a sleeve 40 loosely mounted on the shaft 32. On the inner end of the sleeve 40 and integrally formed therewith is a circular cup-shaped member 41, which forms part of a clutching device to cause the shaft 32 to rotate the worm shaft 13 (Figs. 6 and 7).

The sprocket wheel 31 is provided with an integrally formed sleeve 42 which is concentric with the shaft 32 and rigidly secured to the sleeve 40 by means of dowel pins 43 engaging the perforations in the end of the sleeve 42, and also perforations in the projection 44 formed integrally with the sleeve 40. A nut 45 engaging the threaded portion 46 on the outer end of the sleeve 40 securely holds the sprocket 31 in position. Feathered on the shaft 32 and located within the cup-shaped member 41 is a ring or collar 47 provided with radially-projecting pairs of spaced lugs 48 in which are pivotally mounted levers 49, at 50. Between the ring or collar 47 and the circular flange 51 of the member 41 are loosely positioned spaced sections or shoes 52 of the clutch adapted to frictionally engage the inner surface of the flanged portion 51 of the cup-shaped member 41, when the cams 53 on the levers 49 are moved outwardly and away from the shaft 32 by centrifugal force exerted upon the ends of the levers 49, as the shaft is rotated by the engine. As shown in Fig. 7, the contacting edges of the cams engage the central portions of the shoes 52, and prevent the shoes from slipping out of position in the cup-shaped member 41 since pairs of flanges 66 of the shoes 52 embrace opposite sides of said cams.

The member 54 is integrally formed with a sleeve 55 which is loosely and slidably mounted on the shaft 32. The inner end 56 of the sleeve 55 projects inwardly within the member 54 and is substantially cylindrical in shape, so that as the sleeve 55 is moved towards the cup-shaped member 41, balls 57 on the levers 49 will be engaged between the cylindrical member 56 and the concaved inside of the cone 54 and be forced inwardly towards the center of the cone 54. The free ends of the levers 49 are moved inwardly towards the shaft 32 and the cams 53 are removed from engagement with the shoes 52, thereby releasing the shoes from their clutching positions with the cup-shaped member 41, and stopping rotation of the member 41 and the sprocket 31 through which the tractor is driven.

A hand lever 58, pivotally mounted at 59 on the table 3, is provided with a yoke 60 which engages a groove 61 in the sleeve 55. As the lever 58 is oscillated, the member 54 will be carried to or away from the levers 49 to either disengage the clutch or to permit the clutch to be engaged by centrifugal force acting on levers 49. When the lever 58 is moved to the left, as shown in Fig. 7 of the drawings, the balls 57 will be released from their sockets in the cone 54 and the levers will be thrown outwardly and away from the shaft 32, causing the cams 53 to engage the shoes and force them into gripping relation with the annular member 51 of the cup-shaped member 41, thereby causing the member 41 to be rotated by the rotating shaft 32 and through the chain 30 to drive the wheels 4. The diameter of the cone 54 is sufficient to permit the ends of the levers to extend to their limits of movement, in order that the cams 53 may thrust the shoes 52 into firm engagement with the member 41, but even at the extreme limit of the outward movement of the balls 57, they will always be in a position to permit the cone 54 to encompass them.

The handles 62 are diagonally disposed with respect to the tractor and are secured by means of bolts 63 at their lower ends to the side members 1, and project upwardly and outwardly from the sides of the tractor and rearwardly of the same to provide a means for steering the tractor.

It will be seen, by this novel connection of the lower ends of the handles to a portion of the frame, which connection is midway between the traction wheels 4, that by bearing heavily upon the handles 62, the front of the tractor will be elevated, and while in this position may be shifted laterally to the left or right to change the direction of travel. A link 64 connected to the transverse plate 21 is adapted to provide a means for connecting thereto an agricultural implement or any kind of device which is to be conveyed by the tractor (Figs. 2 and 3).

The operation of my device is as follows:—

It is first necessary to start the engine 33 by means of the crank 36. This is done by engaging the members of the dog clutch 38 and 39, after the lever 58 has been moved towards the rear of the tractor to disengage the clutch members 51 and 52. The shaft 32, when the clutch members 51 and 52 are disengaged, is free to be rotated by the engine, since the connections which are adapted to operate the wheels 4 are disengaged.

In starting, the crank is rotated in the direction indicated by the arrow in Fig. 2. As soon as the engine has been started and it is desired to drive the tractor forwardly, the lever 58 is moved forwardly so that the slidable member 54 will be moved forwardly to permit the free ends or balls 57 of the levers 49 to move outwardly under centrifugal force caused by the rotation of the levers 49 which are pivoted in the rotating ring 47, and which is in turn keyed to the rotating shaft 32. This outward movement of the levers 49 compels the cams 53 to force the clutch sections or shoes 52 outwardly and into engagement with the cup-shaped member 41. The sprocket wheel 31 being rigidly secured to the sleeve 40 which is being rotated in the same direction as the shaft 32, since the clutch members are in engagement, is also rotated, causing the chain to be operated in the direction indicated by the arrows in Fig. 4.

The sprocket wheel 28 and gear are likewise being rotated in the same direction as the sprocket 31, but the gear 23 will be rotated in a reverse direction as indicated by the arrow in Fig. 4. The worm shaft 13 and the worms 14 will be rotated in the same direction as the gear 23, and since the teeth of the worm 14 slant towards the front of the machine, as indicated by Fig. 3, the gear 7 will be rotated in the direction indicated by the arrow in Fig. 3, and likewise the wheels will be rotated in the same direction and the tractor will be moved forwardly.

If, at any time, the chain 30 becomes slack, it is only necessary to loosen the nut on the bolt 20 so that the gear box may be rotated in a downward direction, with the shaft 13 as the axis of rotation, until the chain is tight, when the nut may again be tightened and the gear box 16 held in place.

As has been stated above, the position of the lower end of the handle 62 between the traction wheels 4 is admirably adapted to control the direction of the tractor.

It will be noted that the handles 62 of the machine, the handle 58 of the clutch mechanism, and the crank 36 for the engine are so placed as not to interfere with each other and they are readily in reach of the single operator of the tractor.

The fact that each traction wheel is directly driven is an advantage as there is less slippage.

What is claimed is:—

1. In a tractor, a frame, axles rotatably mounted transversely of the frame, traction wheels secured to the axles within the frame, a gear rigidly mounted on each axle beyond the confines of the longitudinal side of the frame, a shaft rotatably mounted on the frame and provided with spaced worm gears, said gears and shaft being located beyond the side of the frame, each worm gear being adapted to mesh with a gear on the axle, an engine mounted on the frame, a shaft driven by the engine, and a chain connection between the drive shaft of the engine and the worm shaft.

2. In a tractor, a frame, traction wheels rotatably mounted in the frame, a worm shaft adapted to rotate the wheels, an engine mounted on the frame, a shaft driven by the engine, a box journaled on the worm shaft, a gear in said box mounted on the worm shaft, a stub shaft mounted in bearings in the box provided with a gear meshing with the gear on the end of the worm shaft, a sprocket secured to the stub shaft, and a chain operatively connected with the sprocket on the stub shaft and also operatively connected with a sprocket on the drive shaft.

3. In a tractor, a frame, axles rotatably mounted transversely of the frame, traction wheels secured to the axles, a gear rigidly mounted on each axle, a longitudinal shaft rotatably mounted on the frame and provided with spaced worm gears, each worm gear being adapted to mesh with a gear on the axle, an engine mounted on the frame, a shaft driven by the engine, a chain connecting the drive shaft of the engine with the worm shaft, and handles connected at their lower ends to the frame between the traction wheels projecting diagonally upward and outward from the frame providing a steering means for the tractor.

4. In a tractor, a frame, axles rotatably mounted transversely of the frame, traction wheels secured to the axles, a gear rigidly mounted on each axle, a longitudinal shaft rotatably mounted on the frame provided with spaced worm gears, each worm gear being adapted to mesh with the gear on the axle, an engine mounted on the frame, a shaft driven by the engine, a flexible driving connection connecting the drive shaft of the engine with the worm shaft, the said flexible connection being bodily adjustable at one end, with the worm shaft forming the axis of adjustment.

5. In a tractor, a frame, axles rotatably mounted transversely of the frame, traction wheels secured to the axles, a gear rigidly mounted on each axle, a longitudinal shaft rotatably mounted on the frame provided with spaced worm gears, each worm gear being adapted to mesh with the gear on the axle, an engine mounted on the frame, a shaft driven by the engine, a flexible driving connection connecting the drive shaft of the engine with the worm shaft, the said flexible connection being bodily adjustable at one end with the worm shaft forming its axis of adjustment, and means for locking the adjusted end of the flexible connection in position.

6. In a tractor, a frame, axles rotatably mounted transversely of the frame, a traction wheel mounted on each of the axles, a gear rigidly mounted on each axle enclosed by a casing secured to the frame, a longitudinal shaft rotatably mounted in the upper ends of the casings and provided with spaced worm gears, each worm gear likewise being enclosed within a casing and adapted to mesh with the gear in said casing, an engine mounted on the frame, a shaft driven by the engine, a driving connection between the drive shaft of the engine and the worm shaft, and means for tilting the tractor on one of the driven traction wheels whereby the tractor may be steered.

7. In a tractor, a frame, axles rotatably mounted in the frame, traction wheels rigidly secured to the axle, a gear rigidly mounted on each axle, a driven shaft provided with worm gears meshing with the gears on the axles, a gear box rotatably mounted on the end of the shaft, an engine mounted on the frame provided with a drive shaft, the said gear box providing a bearing for the end of the driven shaft, a chain connection between the drive shaft of the engine and the driven shaft, and gears rotatably mounted within the gear box, one of said gears being fixed to the end of the driven shaft, said gear box being movable about the driven shaft and providing a means for loosening or tightening the chain connection.

8. In a tractor, a frame, axles mounted therein, traction wheels mounted on the axles, a longitudinal driven shaft geared to the axles, a box journaled on the end of the driven shaft, a drive shaft, a driving connection between the drive shaft and the driven shaft, said driving connection including gearing encased within said box, and means for adjustably connecting said box to the frame.

In testimony that I claim the foregoing as my own, I have hereto affixed my signature.

WILLIAM GEORGE WILMS.